United States Patent Office 2,912,686
Patented Nov. 10, 1959

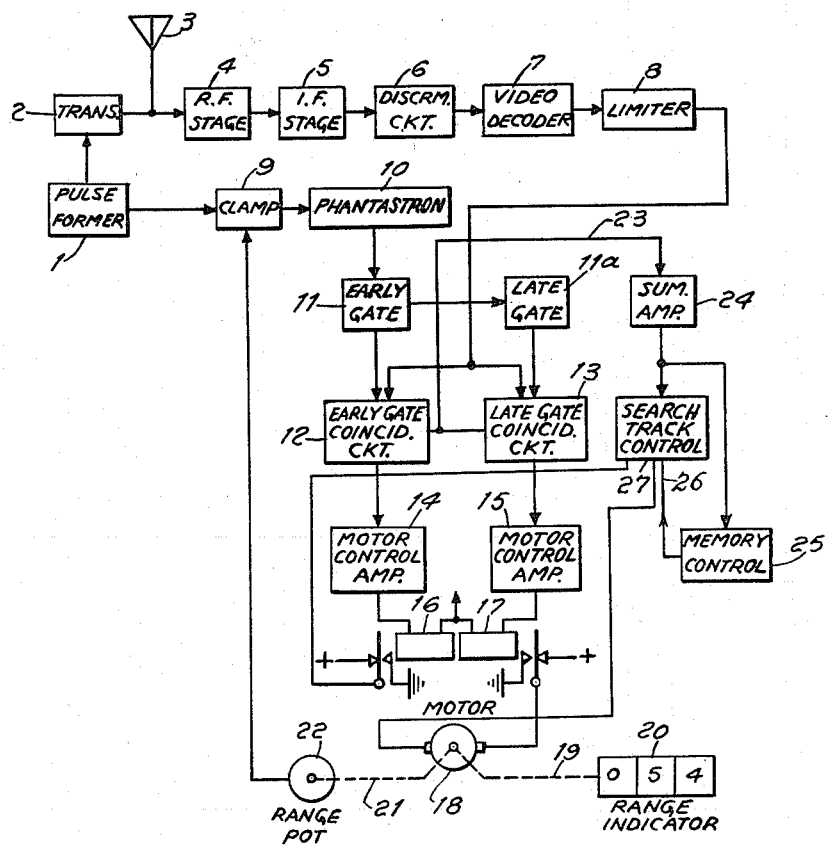

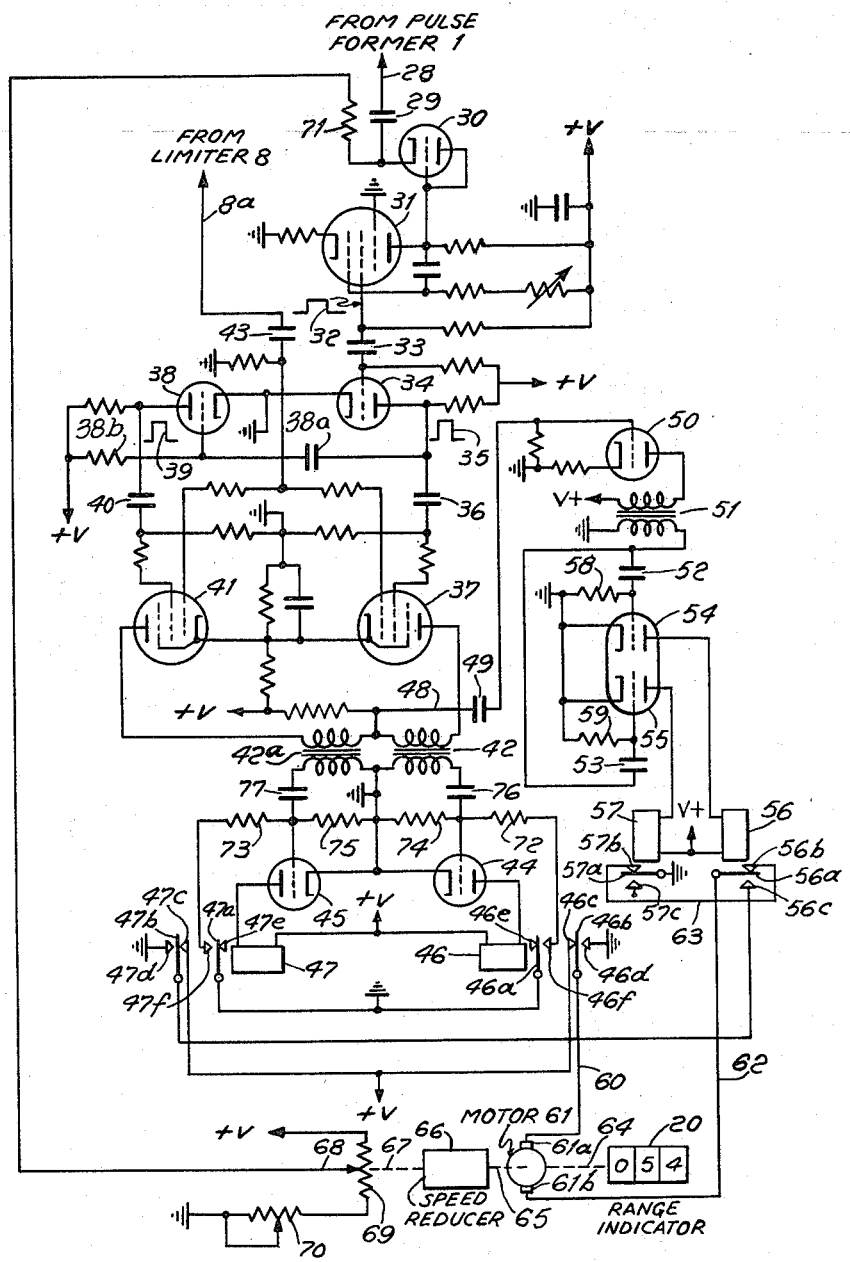

2,912,686

DISTANCE MEASURING EQUIPMENT

Sven H. M. Dodington, Nutley, and Benjamin B. Mahler, Paramus, N.J., assignors to International Telephone and Telegraph Corporation, Nutley, N.J., a corporation of Maryland Application August 29, 1955, Serial No. 530,950

4 Claims. (Cl. 343—7.3)

This invention relates to distance measuring equipment and more particularly to distance measuring equipment employing a servo system having both mechanical components and electronic circuitry to obtain the distance measurement.

In many air navigation systems, the mobile equipment, in order to determine its distance from a known location, transmits a coded group of interrogation signals which are received and retransmitted by a transponder at the known location. The retransmitted signals or replies to the interrogation signal are detected by the mobile equipment and the time elapse between the first transmission and the detection of the reply signals is measured to indicate the distance between the mobile apparatus and the known location of the beacon. This mobile equipment must, upon the transmission of its first interrogation signal, commence to search in time in order to locate the coded reply signals since the mobile equipment has no apriori knowledge of its actual distance to the beacon. Once the search reveals or detects the coded reply signals it is necessary for the mobile equipment to "lock-on" or track these signals as the distance, and thus the time interval, varies. While many circuits have been devised to perform the search-track operation in various types of equipment, in general, the equipment has been extremely complex and has had a low degree of reliability.

One of the objects of this invention, therefore, is to provide distance measuring equipment which will provide a high degree of reliability with a simplicity of circuitry and operation.

Another object of this invention is to provide distance measuring equipment in which the electronic search-track circuitry is controlled responsive to a mechanical system.

Still another object of this invention is the provision of a reversible motor to control both a counter to indicate distance and a variable bias to adjust the time delay between the transmitted signal and the generation of a triggering signal which controls the generation of gating pulses.

One of the features of this invention is the provision in a distance measuring system, having a transmitter which radiates signals in response to the output of a signal generating circuit and a receiver associated with the transmitter to detect returned echoes of the transmitted signals; distance determining equipment including trigger pulse generating means responsive to the output of the signal generating circuit to produce a triggering pulse signal whose trailing edge causes an early gate pulse to be produced. The trailing edge of the early gate pulse triggers a late gate pulse generator. The detected echo signals are coupled to a first and second coincidence circuit along with the early and late gate pulses, respectively. A motor is provided whose rotation is responsive to the outputs of either of the coincidence circuits and which is mechanically coupled to a counter which displays the distance measurement and to a variable biasing potential. The biasing potential whose amplitude is proportional to the motor rotation is coupled to the trigger pulse generator to vary the time between the transmission of the signals and the generation of the triggering pulse.

Another feature of this invention is the inclusion of an anti-hunt feature in the control circuit of the motor to reduce the oscillations of the motor in coming to a rest position.

A further feature of this invention is the provision of a memory circuit which maintains the circuitry in a "track" condition during a momentary loss of echo signals but returns the system to a "search" condition if the echo signals are lost for any appreciable period of time.

It is to be understood that in referring to "echoes" of signals both in the specification and claims, there is included not only returned signals which are reflected from an object as in radar, but also signals which are received and retransmitted as, for example, by a transponder.

The above-mentioned and other features and objects of this invention will become more apparent by reference to the following description taken in conjunction with the accompanying drawings, in which:

Fig. 1 is a block diagram of one embodiment of the distance measuring system in accordance with the principles of our invention; and Fig. 2 is a schematic circuit diagram of the distance measuring equipment in accordance with the principles of our invention.

Referring to Fig. 1 of the drawings, the distance measuring equipment in accordance with this invention, used by a mobile unit, is seen to comprise a pulse former 1 which couples a pulse coded interrogation signal to the transmitter 2 whose output is radiated by antenna 3 to a ground beacon (not shown) at a known location. The coded interrogation signals radiated by antenna 3 are detected by the ground beacon and used to modulate a transmitter which then radiates reply signals having the same code as the signals radiated by antenna 3. These reply signals are picked up by antenna 3 and coupled through the usual radio frequency (R-F) stages 4, intermediate frequency (I-F) stages 5 and discriminator circuit 6 to a video decoder 7 where the pulse coded reply signals are recognized. The recognized reply signals having the same code as the transmitted signals are coupled to a limiter circuit 8.

Simultaneously with the coupling of the pulse coded interrogation signals to the transmitter 2, the pulse former 1 couples the same signals to a clamping circuit 9 whose output is coupled to a phantastron circuit 10. The phantastron 10 generates a pulse signal dependent upon the output of clamping circuit 9 and this pulse signal is coupled to an early gate generator circuit 11. The trailing edge of the output of the phantastron circuit signal 10 causes the generator 11 to produce in its output an early gate pulse which is coupled to the early gate coincidence circuit 12.

At the same time that the pulse output of the early gate generator 11 is coupled to the early gate coincidence circuit 12 it is also coupled to a late gate generator 11a where the trailing edge of the early gate pulse causes the late gate generator 11a to produce a late gate pulse signal which is coupled as one input to the late gate coincidence circuit 13.

The pulse coded reply signals forming the output of limiter 8 are also coupled to the early and late gate coincidence circuits 12 and 13, respectively. If a reply signal occurs simultaneously in time coincidence with the early or late gate pulses then the early gate coincidence circuit 12 or the late gate coincidence circuit 13 couples a signal to the motor-control amplifiers 14 or 15, respectively. The output of the motor-control amplifiers 14 and 15 operates relays 16 and 17, respectively, in such a manner, as hereinafter explained, as to cause the motor 18 to rotate in a direction dependent upon whether the amplifier 14 or amplifier 15 has an output. As the motor 18 turns, it is mechanically coupled via linkage 19 to a range indicator or counter 20 of the Veeder-Root type. Simultaneously, over mechanical linkage 21, the motor 18 causes the range potentiometer 22 to vary the bias on clamping circuit 9 thus changing the time of occurrence of the output of the phantastron 10 causing the gate pulses generated by early and late gate generators 11 and 11a to "track" the reply signals.

When either the early gate or late gate coincidence circuits 12 and 13 has an output, a signal is coupled over line 23 to a sum amplifier 24. When a signal is present in the sum amplifier 24, an output signal is coupled to the memory circuit 25 whose output coupled over line 26 causes the "search-track" control 27 to cause the system to continue "tracking" the reply signals for a predetermined period of time.

The signal output of sum amplifier 24 is also coupled to the "search-track" control circuit 27 to cause it to couple voltage to motor 18 in such a manner that the motor 18 is continuously rotating and thus continuously varying the setting of the range potentiometer 22 which in turn continuously varies the time of occurrence of the output of the phantastron 10 due to the varying bias coupled to clamping circuit 9. When a reply signal is recognized causing an input to the sum amplifier 24, the output of the sum amplifier 24, coupled to the search-track control circuit 27, causes a signal to be generated which moves the system from the search position to the track position. The above operation will be more clearly explained with reference to the schematic diagram of Fig. 2.

Referring now to Fig. 2, the output of the pulse former 1 shown in Fig. 1 is coupled over line 28, through coupling capacitor 29, to the cathode of a clamping tube 30. The output taken from the plate of the clamping tube 30 is coupled to the plate circuit of the phantastron tube 31. The pulse output of the phantastron taken from the second grid as indicated by the pulse 32 is coupled through coupling capacitor 33 to the grid of an early gate pulse generator 34. The output pulse of the early gate generator 34 shown at 35 is coupled through coupling capacitor 36 to the second grid of the early gate coincidence tube 37. Simultaneously, because the anode of the early gate pulse generator is coupled directly to the grid of the late gate pulse generator tube 38 via differentiating network including condenser 38a and resistor 38b, a late gate pulse 39 is coupled from the plate of tube 38 through coupling capacitor 40 to the second grid of the late gate coincidence tube 41.

The recognized reply signals from the limiter circuit 8 of Fig. 1 are coupled over line 8a and through capacitor 43 to form the second input to each of the coincidence tubes 37 and 41. Assuming that a reply signal and a gating pulse occur simultaneously in either of the coincidence tubes 37 and 41, then an output is coupled from the plate through transformer 42 or 42a, respectively. The signals coupled to the primary of transformer 42 or 42a generate a signal in the secondary windings which is then coupled to the grid of the motor-control amplifier tubes 44 or 45. Normally, the motor-control amplifier tubes 44 and 45 are conducting; thus plate current flows in the relay coils 46 and 47 causing the relays to be energized and the armatures 46a, 46b, 47a and 47b to be in their energized position, as shown. When a signal is generated by the coincidence tubes 37 and 41 and coupled through transformers 42 and 42a to the motor-control amplifier tubes 44 or 45, the bias placed upon the grids of the amplifier tubes 44 or 45 cuts them off causing the plate currents to cease flowing in the relays 46 and 47 allowing the armatures 46a, 46b, 47a and 47b to move to their de-energized positions.

When a signal is coupled to the primary windings of transformers 42 and 42a, a signal is also coupled over line 48, through coupling capacitor 49, to the grid of sum amplifier tube 50. When a signal appears on the grid of the sum amplifier tube 50, a signal is induced in the secondary winding of the transformer 51 which is then coupled through coupling capacitors 52 and 53 to the grids of the search-track tube 54 and the memory tube 55, respectively. Like the motor-control amplifier tubes 44 and 45, the search-track tube 54 and the memory tube 55 normally draw plate current and thus the relays 56 and 57 are normally energized causing the armatures 56a and 57a to be in their normally energized positions, as shown. When a signal is coupled through transformer 51 and across cross-coupling capacitors 52 and 53 to the grids of tubes 54 and 55, the tubes are cut off and the plate current ceases to flow causing the armatures 56a and 57a to move at their de-energized positions. It should be pointed out that the time constant due to capacitor 52 and resistor 58 is quite different from the time constant of capacitor 53 and resistor 59. The time constant generated by capacitor 53 and resistor 59, associated with the memory tube 55, causes the signal coupled from transformer 51 to discharge very slowly onto the grid of the memory tube 55, and thus a signal coupled from transformer 51 takes a much longer time to cut off the plate flow in the memory tube 55, while the search-track tube 54 has its plate current flow cut off more quickly when a signal is coupled from transformer 51 through capacitor 52 and thus relay armature 56a is returned to the deenergized position an appreciable time before armature 57a is returned to the de-energized position.

The operation of the foregoing circuit will become clearer from the following description. Let it be assumed that a mobile craft carrying the distance measuring equipment of our invention approaches a ground beacon and emits an interrogation signal which is responded to by the ground beacon and the echo signal detected at the mobile craft as previously explained. The signal coupled to the transmitter is also coupled via line 28 and coupling capacitor 29 to the cathode of the clamping tube 30 whose output controls the generation of the triggering signal 32 in the phantastron 31. The triggering signal 32 causes the early gate pulse 35 to be generated in response to its trailing edge and the late gate pulse is generated in response to the trailing edge of the early gate pulse and thus the trailing edge of the early gate pulse and the leading edge of the late gate pulse are in time coincidence.

At the initiation of a distance measurement the interrogation signal only is being sent out and no echo signal is received and thus no echo signal can be coupled over line 8a and through capacitor 43 to the coincidence circuits 37 or 41. When only one signal input is coupled to the coincidence tubes 37 or 41, no signal is coupled out of coincidence tubes 37 or 41, and sum amplifier 50 will have no signal input, and the search-track tube 54 and memory tube 55 having no biasing signal coupled to their grids from tube 50 continue to conduct causing the relays 56 and 57 to be in their energized position, as shown. Simultaneously, since there is no signal output from the coincidence circuits 37 or 41, no cutoff signal is coupled through transformers 42 or 42a to the grids of the motor-control amplifiers 44 or 45 and thus relays 46 and 47 are maintained in their energized position, as shown.

The position of the relays in their energized position due to the absence of a cutoff signal coupled to the grids of the associated relay control tubes causes the distance measuring equipment of our invention to be placed in a "search" condition. In the search condition it is seen that a positive voltage is coupled over line 60 to the motor 61 through contact 46c and armature 46b while the other side of the motor is coupled to ground through line 62, armature 56a, contact 56b, line 63, contact 57b and armature 57a. A positive voltage applied to one side of the motor 61 and the circuit being completed by having the other side coupled to ground, the motor 61 is caused to turn in what may be assumed for purposes of explanation to be a clockwise direction. As the motor 61 turns in its positive or clockwise direction, mechanical coupling 64 causes the veeder counter to start turning in a positive manner, displaying greater numbers and keeping track of the mileage or distance. Simultaneously, the output of the motor 61 is coupled via mechanical linkage 65, gear box 66, mechanical linkage 67 to the arm 68 of the potentiometer 69. One end of the potentiometer 69 is coupled to a source of positive voltage while the other terminal is coupled to ground through a variable resistance 70. Thus it is seen that the output voltage of potentiometer 69 is dependent upon the position of the arm 68 which is responsive to the rotation of motor 61. This positive voltage from arm 68 is coupled through resistor 71 to bias the cathode of the clamping tube 30. At the initiation of a distance measurement, the biasing of tube 30 allows the phantastron 31 to produce a triggering signal immediately after the transmission of the distance measuring signals. As the clamping tube cathode bias is altered due to the movement of motor 61 and potentiometer arm 68, the clamp output causes the output triggering pulse 32 of the phantastron 31 to occur after a time delay which continues to increase as long as the motor turns in a positive direction. Since the time of occurrence of the early gate pulse is responsive to the time of occurrence of the phantastron pulse output 32 which in turn is responsive to the position of the potentiometer arm 68, it is obvious that the early gate pulse 35 will have its time of occurrence vary as the arm 68 of potentiometer 69 is varied. Since the late gate pulse is responsive to the early gate pulse, this too will have its time of occurrence be responsive to the movement of the arm 68. It has already been shown that when in the search position the motor 61 continuously rotates causing the arm 68 to traverse the potentiometer resistance from one end to the other causing the early and late gate pulses to "search" for a signal by occurring after a greater time delay relative to the transmitting signals than the preceding gate pulses.

The distance measuring equipment of our invention enters its second condition when an echo signal coupled over line 8a and through capacitor 43 occurs in tube 41 in time coincidence with the late gate pulse 39 thus causing an output to be coupled from the plate of the late gate coincidence tube 41. This output signal is coupled through transformer 42a to the grid of the motor-control amplifier 45 which cuts off tube 45 stopping the flow of plate current in the relay 47. Time coincidence between a gate pulse and echo signal normally occurs first in the late gate coincidence circuit because the gating pulses are caused to search outward from zero time. It is of course obvious to those skilled in this art that searching can just as easily be initiated at a maximum distance and proceed toward zero. When current ceases to flow in relay 47, the armatures 47a and 47b move to their de-energized position where they come in contact with terminals 47d and 47f.

Simultaneously with the movement of the armatures of relay 47 to their de-energized position, a signal is coupled over line 48, through coupling capacitor 49, to the sum amplifier 50 whose output, coupled through transformer 51 and coupling capacitor 52, causes a bias to be placed upon the grid of tube 54 cutting off the plate current flow of the search-track tube 54. When the plate of tube 54 ceases to have current flow, the relay 56 has its armature 56a moved to the de-energized position where it makes contact with terminal 56c. The output of the sum amplifier 50, coupled through transformer 51, is also coupled to the grid of the memory tube 55. However, since the RC components in the grid circuit of the memory tube 55 have a much greater time constant than the time constant in the grid circuit of the search-track tube 54, it takes longer to cut off tube 55 or, in other words, the capacitor 53 discharges slowly because of the large RC time constant. This slow discharge of capacitor 53 enables current to continue to flow in the plate circuit of tube 55 keeping the armature 57a of relay 57 in its energized position. Thus it is seen when the late gate coincidence circuit 41 detects a time coincidence between an echo pulse and a late gate pulse, the motor 61 continues to rotate in the same positive direction because the positive voltage is coupled to the motor over line 60, through contact 47c, armature 46b and contact 46c. The other terminal of the motor is coupled via line 62 to ground through armature 56a, contact 56c, armature 47b and contact 47d.

A time coincidence between the late gate pulse and the echo signal allows the motor to continue to rotate in the positive direction causing a greater time delay to be imposed between the transmitted signal and the generation of the triggering signal. Thus, after the coincidence above described occurs and as the gating pulses continue to search out from zero time, a period occurs when the echo signal is bracketed by both the early and late gate pulses and thus an output signal is obtained from both the early and late gate coincidence tubes 37 and 41, respectively. An output signal from both tubes 37 and 41 cuts off the plate current flow in tubes 44 and 45 thus causing armatures 46a and 46b to be moved to their de-energized positions while armatures 47a and 47b are maintained in their de-energized positions. In this condition, when there is time coincidence between both gate pulses and the echo signals, the motor 61 stops rotating. One side 61a is coupled to ground by line 60. The other side 61b of the motor is grounded via line 62, armature 56a, contact 56c, armature 47b and contact 47d. When both sides of the motor are grounded, there is obviously no rotation.

If it is now assumed that the mobile unit is approaching the ground beacon, it can be readily understood that the above described condition is momentary in nature for almost immediately the echo pulse will be in time coincidence with the early gate pulse only. When this happens the output of tube 37 cutting off tube 44 maintains relay 46 in the de-energized condition but the lack of output from the late gate coincidence tube 41 allows plate current to flow in tube 45 returning relay 47 to its energized condition. Under these conditions the motor is caused to rotate in the opposite, counterclockwise or negative, direction because now the terminal 61b previously grounded is coupled to a positive voltage by line 62 and armature 56a, contact 56c, armature 47b and contact 47c. The other terminal 61b which was at first coupled to a source of positive voltage is now grounded via line 60 and armature 46b and contact 46d.

It will be recognized that the motor 61 continues to reverse its rotation in order to "track" the echo signal so long as one of the coincidence tubes 37 or 41 maintains an output which can be coupled through amplifier 50 to tube 54 and maintains relay 56 in the de-energized or track condition. In order to reduce the oscillations or hunting of the motor 61, relays 46 and 47 have additional armatures 46a and 47a which in the de-energized or track condition couple resistors 72 and 73, respectively, in parallel with resistors 74 and 75 and thus varies the discharge rate of capacitors 76 and 77, respectively. In other words, the same amplitude value of an input signal causes a motor reversal at different times in the search and track conditions.

In the event that after detecting an echo signal the distance measuring equipment of our invention should lose the signal, the bias which is built up on capacitor 53 in the grid of the memory tube 55 continues to maintain tube 55 in the cutoff position. Thus, while no signal is being coupled from the output of motor controls 44 or 45 or the search-track tube 54, relays 46, 47 and 56 will be in the energized position but, since it takes a longer time for capacitor 53 to discharge, relay 57 will continue in the de-energized position. This causes the motor 61 to continue to track rather than search; and what actually occurs is that the terminal 61a coupled to line 60 will be coupled to a positive voltage via armature 46b and contact 46c but the terminal 61b coupled to line 62 will not be coupled to ground but to open contact by armature 56a, contact 56b and contact 57b. If the echo signals should be detected before the capacitor 53 is completely discharged then the distance measurement is accurate in an extremely short time and thus the necessity of returning the whole system to a search position is obviated. However, as soon as the capacitor 53 discharges, relay 57 is energized due to the plate current flow and the terminal coupled to line 62 is then coupled to ground and the motor 61 starts to rotate in what was assumed to be a clockwise position.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a radio distance measuring system of the character described wherein a first transmitter radiates signals and a receiver associated with said transmitter detects returned echoes of said signals and the time elapsed between the transmission of the signals and the reception of the echoes is measured to determine the distance between said transmitter and the echoing means; distance measuring means comprising signal generating means, means to radiate the output of said signal generating means, trigger pulse generating means responsive to the output of said signal generating means to generate a triggering pulse signal, gate pulse generating means to generate early and late gating pulses responsive to said trigger pulse signal, means to detect said returned echo signals, a first coincidence circuit to produce a first output signal responsive to the time coincidence of said early gate pulse and detected echo signal, a second coincidence circuit to produce a second output signal responsive to the time coincidence of said late gate pulse and detected echo signal, a motor, a counter mechanically coupled to said motor, means to produce a biasing potential, means to couple said biasing voltage to said trigger pulse generating means to cause a time delay proportional to said bias between the transmission of said radiated signals and the generation of said triggering pulse, means responsive to the rotation of said motor to vary said biasing voltage, a source of current for driving said motor, a pair of relays each having a relay coil, a front and back contact and an armature, means connecting a contact of each relay to one side of said source of current, means connecting the other contact of each relay to the other side of said source of current, means connecting the armature of each relay to a different side of said motor, said armatures normally touching the contact connected to the same side of said source of current, means coupling said first coincidence circuit to one of said pair of relays to actuate its armature in response to output from said first coincidence circuit and to thereby drive the motor in one direction, and means coupling said second coincidence circuit to the other of said pair of relays to actuate its armature in response to output from said second coincidence circuit and to drive the motor in the opposite direction, the coincidental actuation of both of said armatures halting said motor.

2. A system according to claim 1, further comprising means including another armature and contact associated with each relay of said pair and responsive to actuation thereof for changing the speed at which the two means coupling said relays to their respective coincidence circuits cause said respective relays to operate in response to the absence of output from their respective coincidence circuits.

3. A system according to claim 1, further including a search-track relay having a first and second contact and an armature, said armature and the first of said contacts being interposed in series between one of the armatures of the pair of relays and the motor, the armature of the search-track relay in search condition being in contact with its said second contact, means connecting said second contact to one side of the source of current to continuously drive said motor in one direction during search, and means coupling the outputs of both of said coincidence circuits to said search-track relay and responsive to an output from either of said coincidence circuits for moving said armature into contact with its said first contact to thereby transfer motor control for tracking purposes to said pair of relays.

4. A system according to claim 3, wherein said means connecting said second contact to said one side of the source of current comprises a relay switch, normally closed during search, interposed in series between said second contact and said source of current, and means responsive to the presence or absence of an output from either of said coincidence circuits for opening and closing said switch respectively, said relay switch together with its energizing means providing a slower response to signals from said coincidence circuits than said search-track relay together with its energizing means whereby said switch closes, and the driving of the motor into search after tracking only occurs, if the output from said coincidence circuits is absent for a given period which is longer than that required for the search-track relay to be returned to search condition.

References Cited in the file of this patent

UNITED STATES PATENTS

| | | |
|---|---|---|
| 2,471,408 | Busignies | May 31, 1949 |
| 2,569,485 | McLennan | Oct. 2, 1951 |
| 2,621,238 | Palmer | Dec. 9, 1952 |
| 2,628,349 | Nightenhelser | Feb. 10, 1953 |
| 2,671,895 | Perkins | Mar. 9, 1954 |
| 2,737,652 | White et al. | Mar. 6, 1956 |